March 6, 1962 G. A. BEERLI 3,024,157
WEB SPLICER
Original Filed Aug. 22, 1958 13 Sheets-Sheet 2
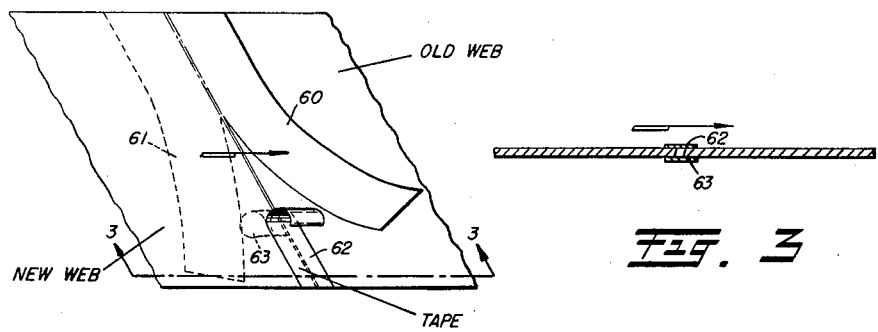
FIG. 2
FIG. 3
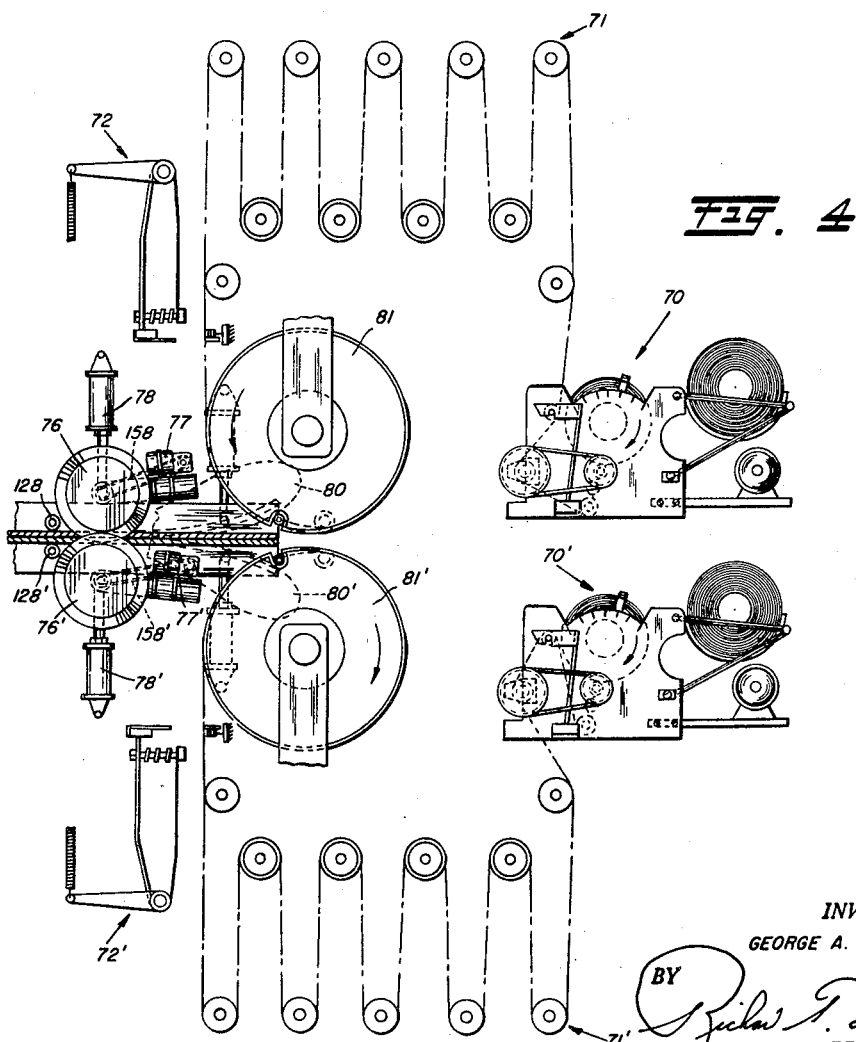
FIG. 4
INVENTOR.
GEORGE A. BEERLI
BY
ATTORNEY

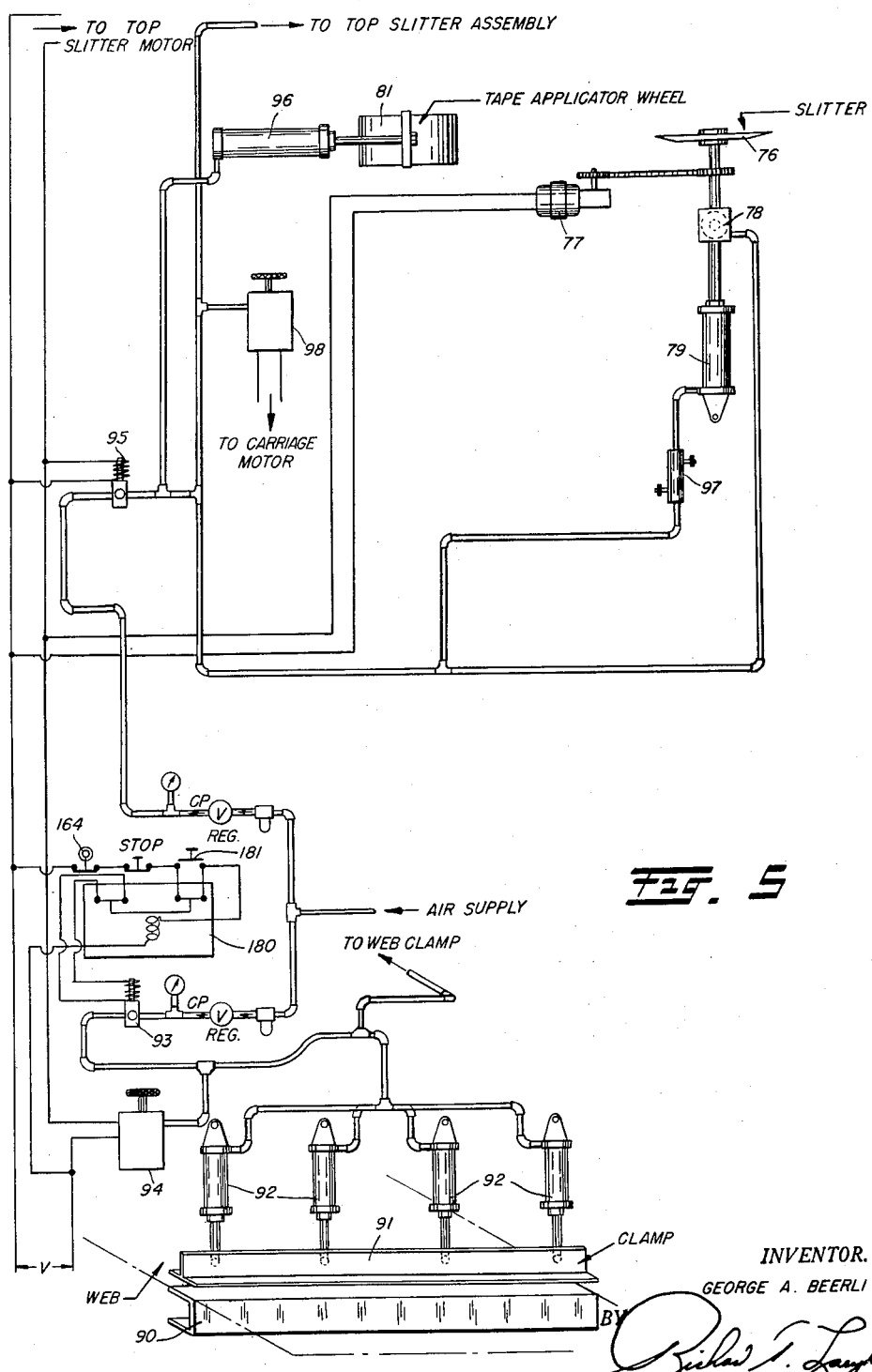

March 6, 1962 G. A. BEERLI 3,024,157
WEB SPLICER
Original Filed Aug. 22, 1958 13 Sheets-Sheet 4
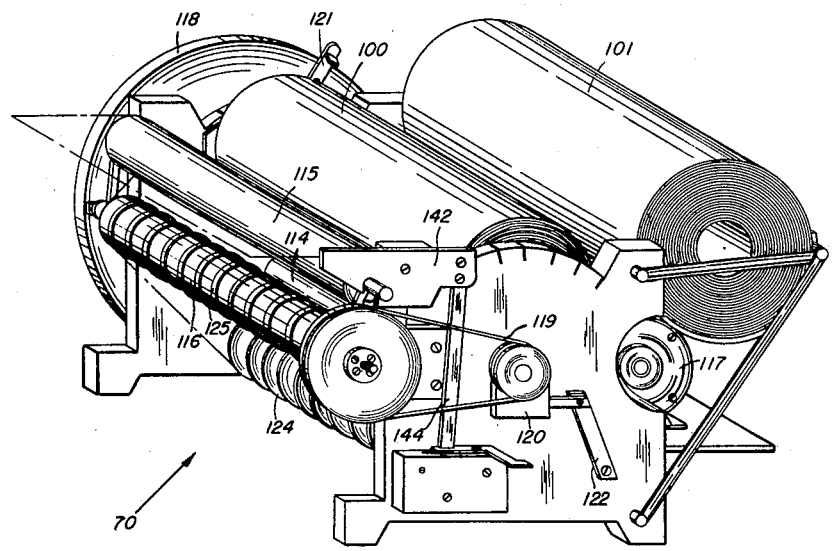
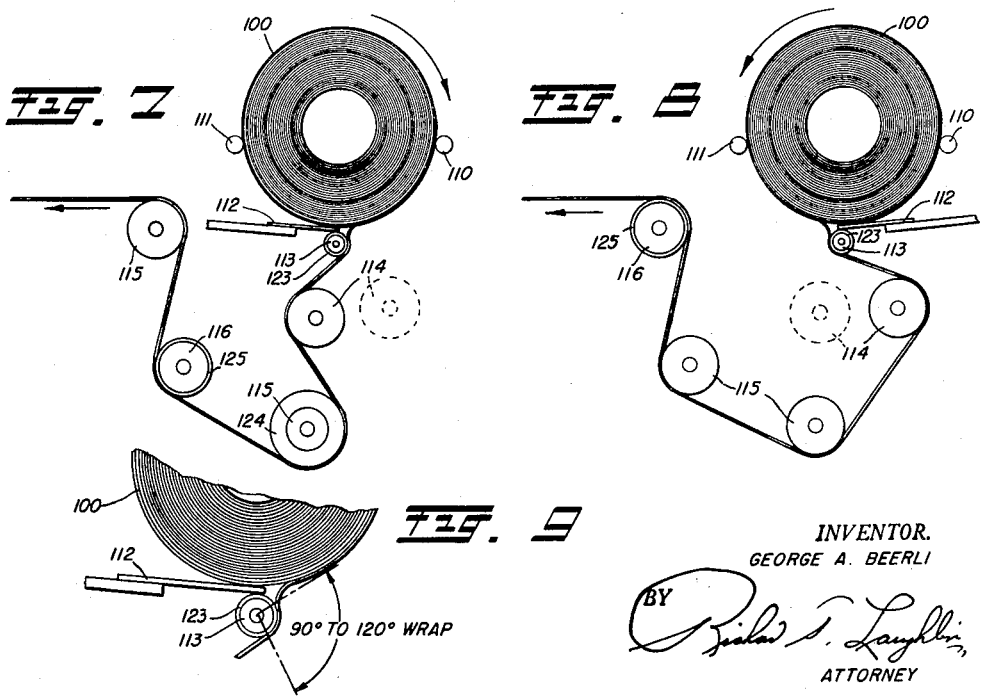
INVENTOR.
GEORGE A. BEERLI
ATTORNEY

INVENTOR.
GEORGE A. BEERLI

March 6, 1962 G. A. BEERLI 3,024,157
WEB SPLICER

Original Filed Aug. 22, 1958 13 Sheets-Sheet 6

INVENTOR.
GEORGE A. BEERLI
BY
ATTORNEY

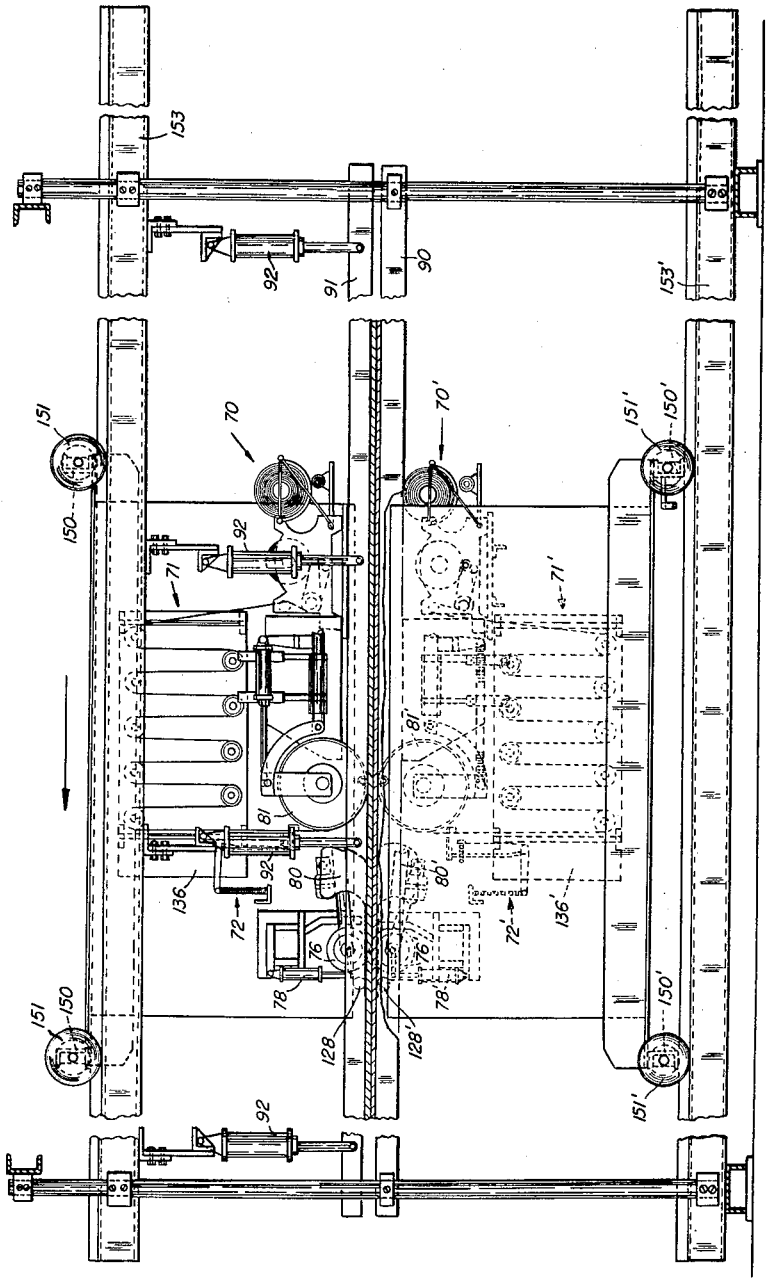

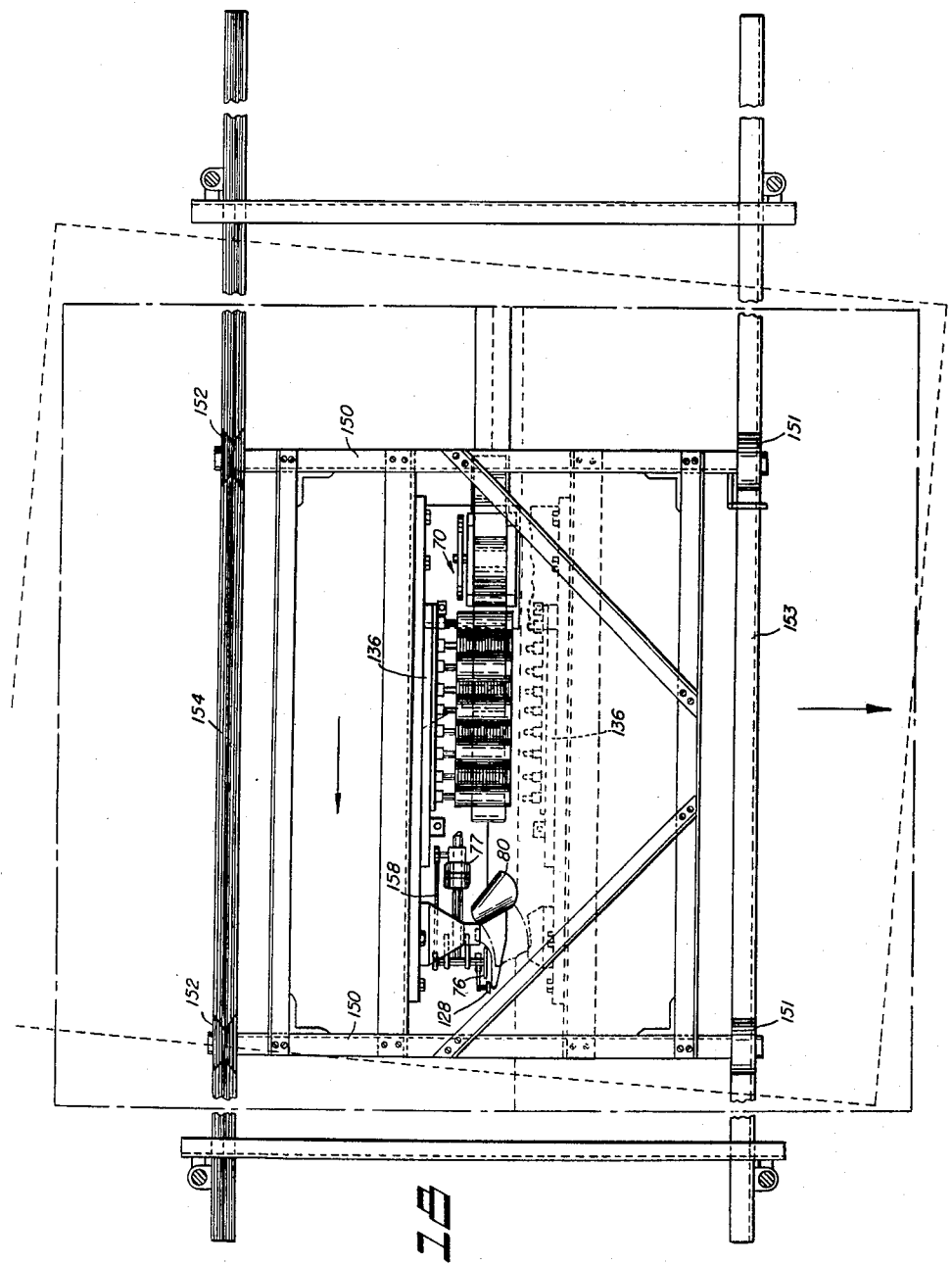

March 6, 1962 G. A. BEERLI 3,024,157
WEB SPLICER
Original Filed Aug. 22, 1958 13 Sheets-Sheet 9

INVENTOR.
GEORGE A. BEERLI
BY
ATTORNEY

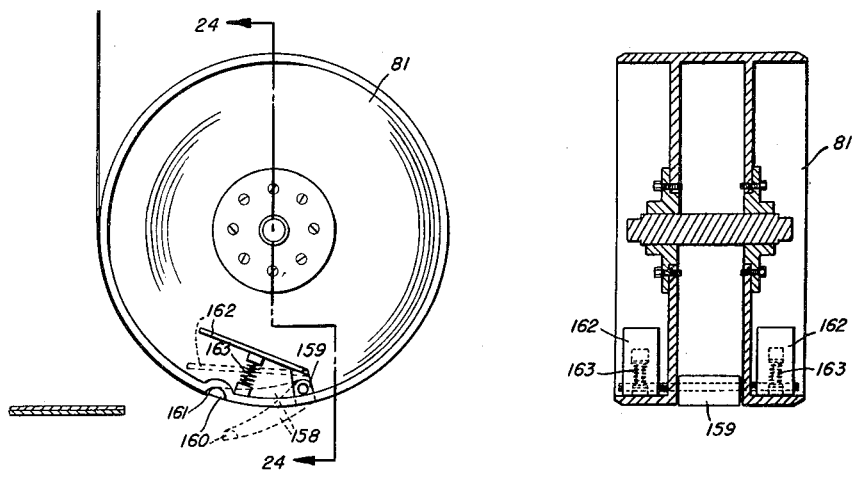
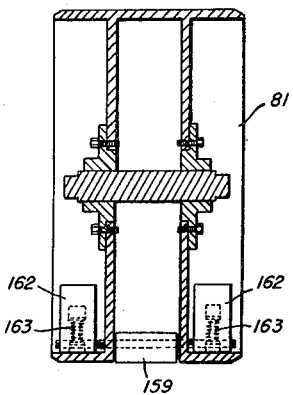
Fig. 23　　Fig. 24
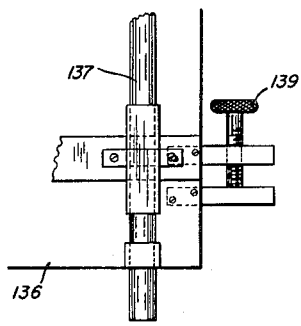
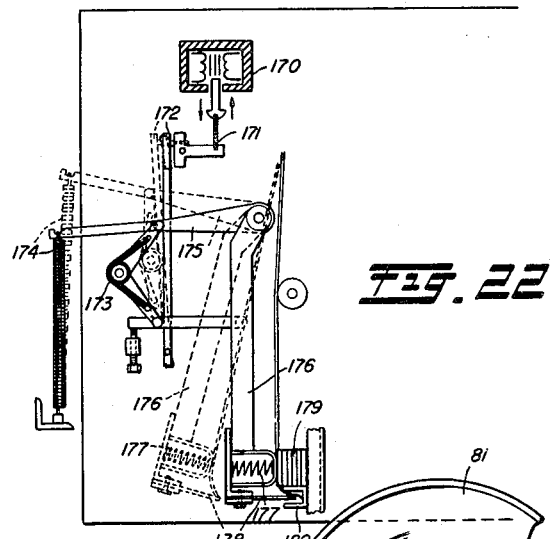
Fig. 21　　Fig. 22
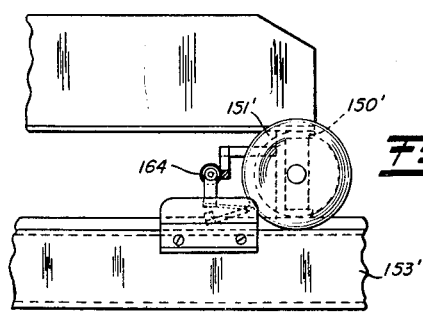
Fig. 25
INVENTOR.
GEORGE A. BEERLI
BY
ATTORNEY March 6, 1962 G. A. BEERLI 3,024,157
WEB SPLICER
Original Filed Aug. 22, 1958 13 Sheets-Sheet 11
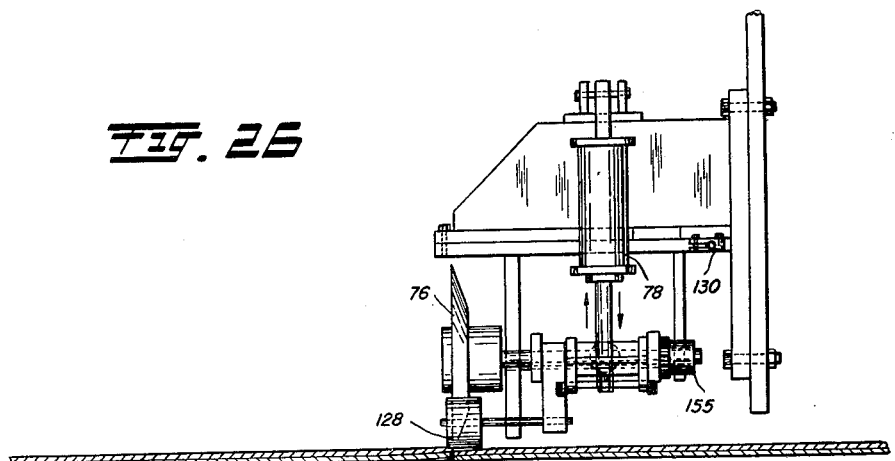
Fig. 26
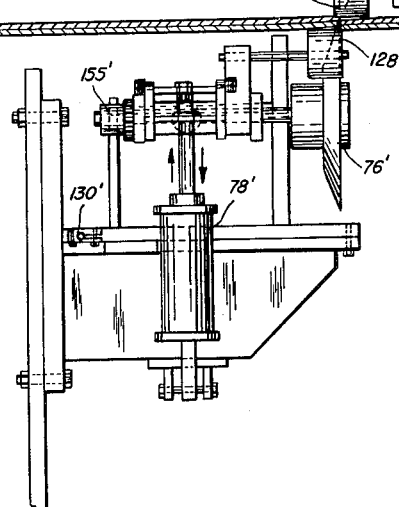
Fig. 27
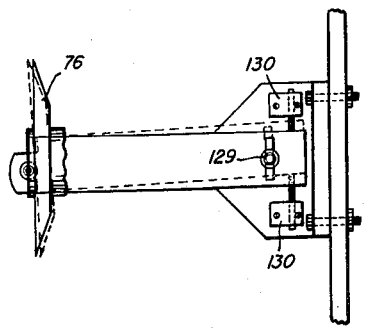
INVENTOR.
GEORGE A. BEERLI
BY
ATTORNEY March 6, 1962 G. A. BEERLI 3,024,157
WEB SPLICER
Original Filed Aug. 22, 1958 13 Sheets-Sheet 12

INVENTOR.
GEORGE A. BEERLI
BY
ATTORNEY

March 6, 1962 G. A. BEERLI 3,024,157
WEB SPLICER
Original Filed Aug. 22, 1958 13 Sheets-Sheet 13

INVENTOR.
GEORGE A. BEERLI
BY
ATTORNEY

United States Patent Office 3,024,157
Patented Mar. 6, 1962

3,024,157
WEB SPLICER
George A. Beerli, North Arlington, N.J., assignor to Congoleum-Nairn Inc., Kearny, N.J., a corporation of New York
Original application Aug. 22, 1958, Ser. No. 756,732. Divided and this application July 21, 1959, Ser. No. 828,522
11 Claims. (Cl. 156—504)

This invention relates to an apparatus for splicing webs together and particularly to an apparatus for automatically applying pressure sensitive tape to splice together the abutting edges of two webs.

This application is a division of my copending application Serial No. 756,732, filed August 22, 1958.

In the past few years, there has been introduced a new type of vinyl plastic floor covering which is produced by printing a design by a rotogravure press on a web of felt impregnated with a water-proofing agent and then coating the printed web with a wear resistant clear vinyl layer. The average room is of substantial dimensions and, therefore, such a floor covering requires rotogravure printing presses having a width of at least nine feet and usually twelve feet.

Heretofore, it has been necessary to splice a new web to an exhausted web by hand, which has necessitated either the temporary stopping of the press so that the webs are stationary during the act of splicing or by utilizing festooners creating enough supply of material to continuously feed the web while the succeding portion of the web is stopped to complete the splice. Because the speeds of modern rotogravure presses range from 200 to 400 feet a minute and higher, it is necessary to have festooners of gigantic proportions in order to store sufficient material to keep the press in operation while the splice is being made by hand. If the press is slowed down or stopped, color registry is lost and, since the usual rotogravure press involves five or six color units, a substantial amount of material is wasted.

Machines are presently available for use in the box board industry and the like for automatically splicing a new roll of web material to the end of an exhausted roll by means of pressure sensitive tape wherein the webs are usually about two to four feet wide. These machines, however, are not readily adapted to splice webs which are substantially wider. The primary failure of such splicing machines is the difficulty in supplying a sufficient length of pressure sensitive tape to produce the spice in the short period of time which is available. The desirability of having an apparatus for automatically splicing a new roll of wide web material to an exhausted roll in a short period of time is readily apparent.

An object of the invention is to provide an apparatus for joining the ends of two wide webs together by means of pressure sensitive tape. Another object of the invention is to provide an apparatus for automatically storing and supplying tape to such a machine. A further object of the invention is to provide a means for making the desired length of tape necessary to complete such a splice available in a rapid and simple manner.

These objects are accomplished by providing a web splicing machine which includes clamps which hold the leading end of the new web on top of the terminal end of the exhausted web in a stationary position, a carriage which transverses across the webs carrying one unit on top of the overlapped webs and another unit underneath the webs comprising pressure sensitive tape dispensers, tape storing devices for storing the pressure sensitive tape supplied from the tape dispensers, opposing shearing cutters for cutting the web, scrap removers for removing the waste ends cut off and tape applicator rolls for aligning the webs and pressing tape over the abutting ends of the cut webs.

In operation, each tape dispenser delivers pressure sensitive tape to its associated storage device which will store in a ready manner sufficient tape to cover the width of the web. When the machine is ready for operation, the leading end of a new web is placed over the terminal end of the old web, the clamps applied to clamp the webs in aligned relationship, the splicing device transverses the webs first shearing the webs, then removing the scrap ends of each web and then pressing the tape supplied from the tape storage device against the butt ends of the web to complete the splice.

The invention will be better understood by the following detailed description when read in accompaniment with the drawings in which:

FIG. 2 is a fragmentary plane of the spliced ends of two webs including the splice point.

FIG. 3 is an enlarged vertical view on the line 3—3 of FIG. 2.

FIG. 4 is a diagrammatic side elevational view of the web splicer and tape dispenser with the carriage, frames and tracks omitted.

FIG. 5 is a diagram of the hydraulic and electric system of the parts immediately controlled thereby.

FIG. 6 is an oblique view of one embodiment of the tape dispenser used in feeding tape for the web splicing operation.

FIG. 7 and FIG. 8 show schematically two methods of feeding tape through the tape dispenser.

FIG. 9 is an enlarged view showing the wrap necessary on the peeler roll for peeling the tape from the roll to feed the tape uniformly to the tape storage device.

FIG. 17 is a side elevational view of the frames, tracks and carriage on the web splicer and tape dispenser and their associated mechanisms.

FIG. 18 is a plan view of FIG. 17.

FIG. 21 is an enlarged detail of the tape length adjusting mechanism.

FIG. 22 is an enlarged detail of the tape clamp and cutting mechanism.

FIG. 23 is an enlarged detail of the tape applicator wheel.

FIG. 24 is an enlarged sectional view on the line 24—24 of FIG. 23.

FIG. 25 is an enlarged detail of the mechanism which actuated the solenoid for the tape cutting operation.

FIG. 26 is an enlarged front elevational view of the cutter assembly.

FIG. 27 is a bottom view of a fragmentary portion of one of the slitter assemblies showing the mechanism used for shear angling the slitters.

Figure 1:
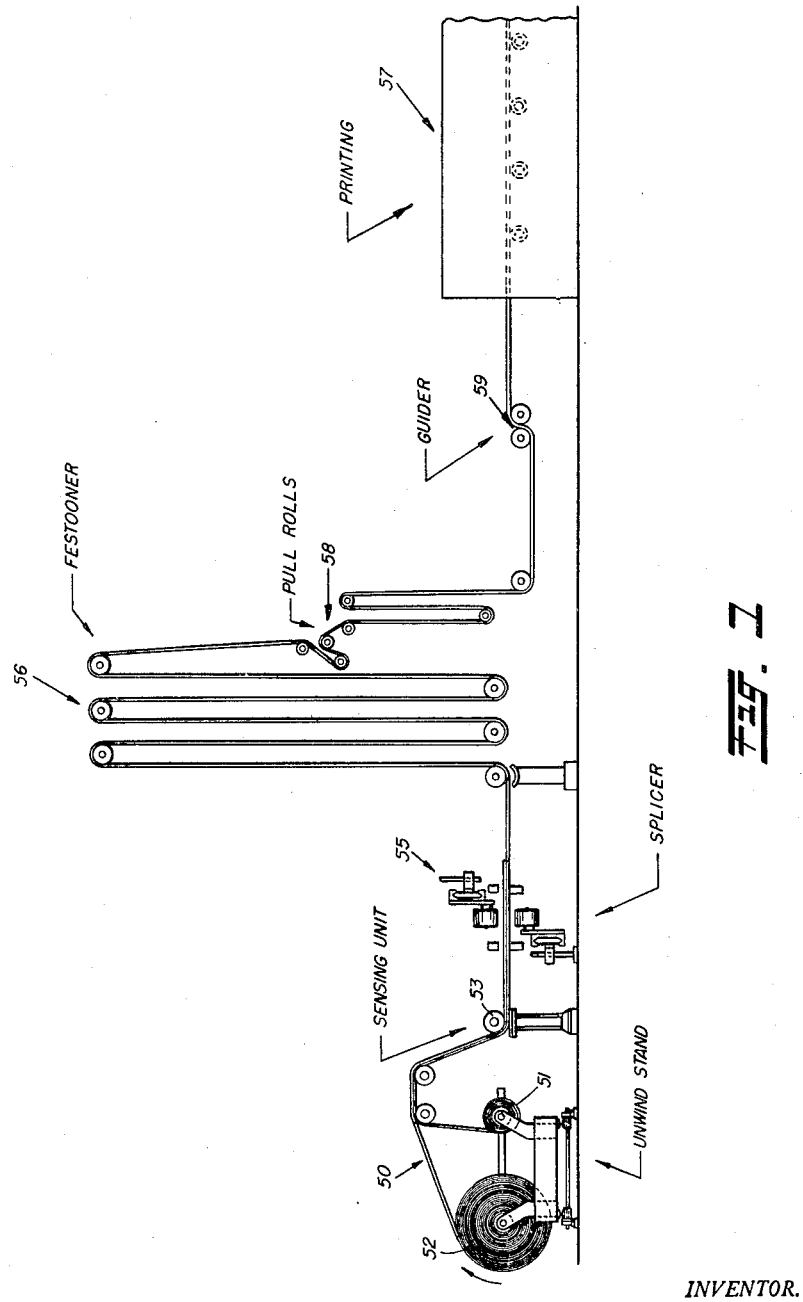
FIG. 1 is a diagrammatic view of the splicing and associated mechanisms illustrating the relation of the splice mechanism to the printing operation.
Figure 10:
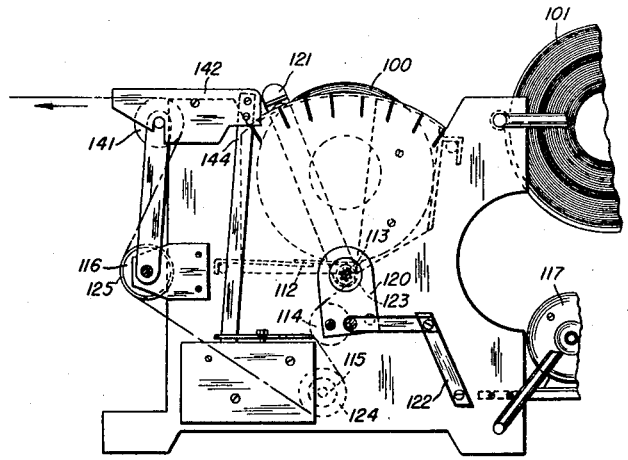
FIG. 10 is a side elevational view of the tape dispenser with the pulley shearers removed to show the associated mechanisms more clearly.
Figure 11:
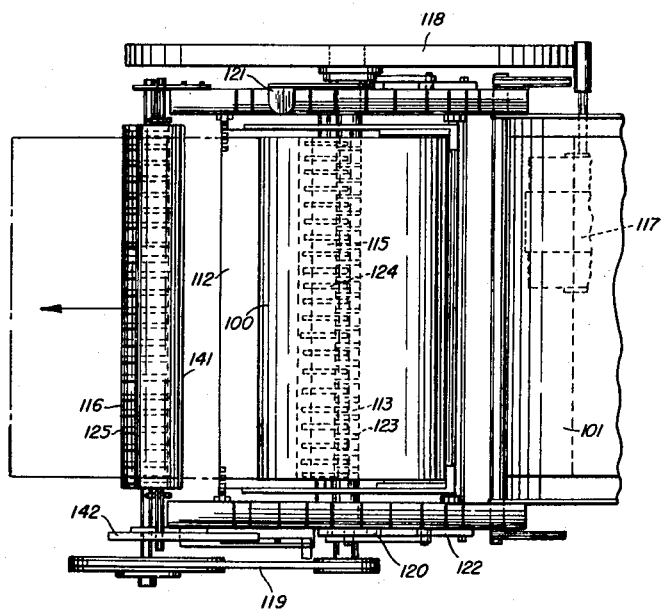
FIG. 11 is a plan view of FIG. 10 with the pulley's belt shown.
Figure 12:
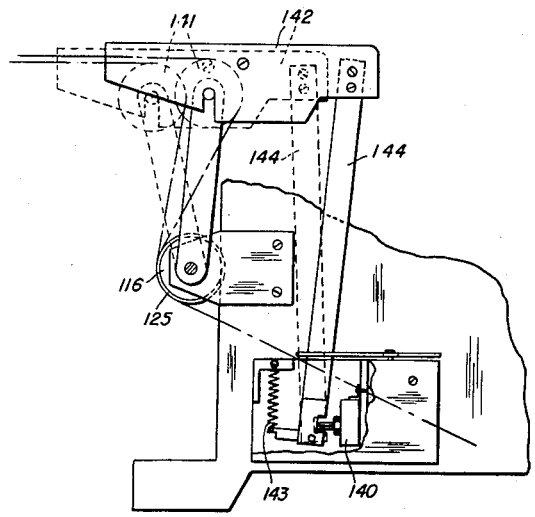
FIG. 12 is a side elevational view of the tension detector drive control unit on the tape dispenser.
Figure 14:
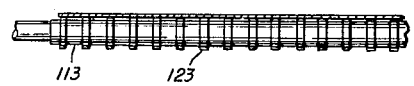
FIGS. 14, 15 and 16 are front elevational views of the peeler roll and grooved idler rolls showing the contact of the adhesive side of the tape.
Figure 15:
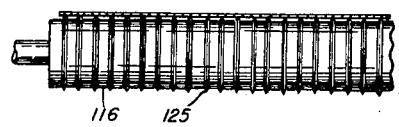
Figure 16:
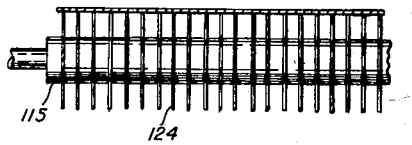
Figure 13:
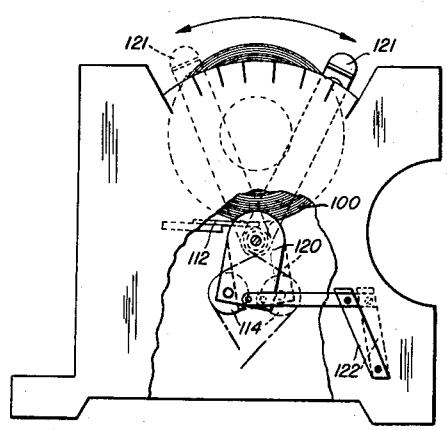
FIG. 13 is a side elevational view showing the wrap control idler and positioning levers.

The general location of the web splicer is shown in FIG. 1 with relation to the supply rolls and printing press. An unwind system is generally indicated at 50 which has provisions for holding two rolls of web material 51, 52. When one roll 51 is substantially exhausted, the new roll 52 is fed by hand on top of the old web without interrupting its travel. The new web passes with the old web to a sensing unit, generally indicated at 53 which aligns the two webs together. The new web is then passed under the splicing mechanism generally indicated at 55. During the time the new web is being placed in position, the festooner generally indicated at 56 begins storing web material. The festooner is large enough to store sufficient web material to supply the printing press 57 when the succeeding portion of the web is stopped to make the splice. The web is fed from the festooner to the printing press through pull rolls 58 which hold the material under tension as it is fed to the press and then through guide rolls 59 which align the web as it goes into the press.

The method for making the splice is illustrated in FIGS. 2 and 3. The superimposed webs are slit transversely and the scrap ends 60, 61 are removed. The ends of the web are butted together with at least a one-eighth inch gap between them. The pressure sensitive tape 62, 63 is then applied to both the top and bottom of the webs so that the webs are held in an abutting relationship with each other.

The web splicing apparatus as shown in FIG. 4 comprises two identical units, one for utilization above the lapped webs and the other for utilization below the lapped webs. Each unit is composed of three parts, a tape supplying means, a tape applicator mechanism and web cutting apparatus. The tape supplying means comprises a tape dispenser 70, a tape storage apparatus 71 and tape holder and cutting apparatus, generally indicated at 72 for holding the tape while the preceding section is cut. The web cutting arrangement comprises a rotary cutter 76 which is driven by motor 77 and hydraulic cylinders 78 and 79 for urging the rotary cutters against the overlapped webs. The tape applying means comprises a plow 80 for removing the scrap ends of the webs and a tape applicator wheel 81 for rolling the pressure sensitive tape over the slit web which also serves in cooperation with the lower tape applying roll 81' to force the two webs into an abutting relationship.

In order to have the splicing mechanism operate properly, it is necessary to have the new and the old webs in close contact with each other. This is conveniently accomplished by clamping the webs together on either side of the splicing unit. A suitable type of clamp is illustrated in FIG. 5 and comprises a fixed lower member 90 located below the webs 51, 52 and a reciprocating upper member 91 located above the webs. The upper member is forced against the webs by means of hydraulic cylinders 92. The web splicer is controlled by a hydraulic system and a series of electric switches which cause the sequence of steps to complete the splice automatically once the apparatus is set in operation. When the start button switch is pushed it causes solenoid valve 93 to operate allowing fluid to flow into the system. As the pressure in the system builds up, first clamps 91 and 91' are closed on the webs 51, 52. When the clamps have been applied the pressure in the system is sufficiently high to cause electric pressure switch 94 to be actuated. This electric pressure switch 94 puts the splicing mechanism in operation by starting motors 77 and 77' which revolve the slitters 76, 76' and also solenoid valve 95 to allow fluid pressure to flow into the hydraulic system of the splicing mechanism. The fluid pressure causes the top tape applicator roll 81 to be forced into position by air cylinder 96. The bottom tape applicator roll 81' is fixed in position. At the same time, fluid pressure flows into the top and bottom slitter assemblies causing fluid cylinders 78 and 78' to press the slitters down. Fluid cylinders 79 and 79' are then placed into operation through limit valve 97 which delays the flow of fluid into the cylinders 79, 79' until fluid cylinders 78, 78' have been put into operation. These fluid cylinders move the slitter knives 76, 76' horizontally together. When fluid pressure has built up in the slitter assemblies, electric pressure valve 98 is placed into operation and starts the motor which drives the mechanism across the webs. The solenoid valves are of three way types and when released or returned to normal position will allow the fluid to be bled from the system.

The automatic web splicing apparatus is able to function because of the utilization of an automatic tape dispenser illustrated in FIGS. 6 to 16. The tape dispenser 70 has a rack for holding a roll 100 of pressure sensitive tape formed by two rods 110 and 111 located on each side of the roll of tape 100 and a flat rest guide 112 located at the base of the tape roll 100 and on which the tape roll rests. The tape is pulled off of the supply roll by a peeler roll 113 located below the guide member. The tape is preferably pulled from the roll at a tangential angle to reduce the possibility of breaking. In the embodiment illustrated in the drawing the drive roll 113 is located as close to the roll of tape as possible. This arrangement greatly facilitates the pulling of the tape from the supply roll and reduces any possibility of the tape breaking. The rest guide member 112 on which the tape roll rests separates the tape roll from the drive roll and thereby prevents damage to the tape roll. The rest guide should be as thin as structurally possible and preferably made of a material which will resist wear and to which the tape will not readily stick. Such a material is "Teflon" which is a tetrafluoroethylene polymer. It is necessary for the tape to have from about 90° to 120° wrap about the peeler roll 113 with the sticky side of the tape contacting the peel roll to allow positive removal of the tape from the roll without danger of breaking. In this arrangement, the tape is pulled from the roll by the peeler roll at a substantial tangential angle to the roll. This angle of removal substantially reduces any tendency of the tape to break since it only exerts minimum force in the direction of the weakest part of the tape.

The desired wrap about the peel roll 113 is obtained by means of a wrap control idler roll 114 which guides the tape from the peeler roll. As shown in FIG. 7, the tape is delivered with the adhesive side up by placing the roll of tape in the dispensing rack so that the roll revolves clockwise as it is unwound. When it is desired to deliver the tape with the adhesive side down, the roll of tape is placed in the rack so that it unwinds in a counter clockwise direction with the guide 112 located so that it extends between the roll and peel roll from the opposite side. The guide roll 114 is adjusted so as to maintain the desired wrap about the peeler roll 113. The tape dispenser is constructed so that the rest guide 113 and the wrap control idler roll 114 can be reversed, and therefore makes possible the adaption of one dispenser to deliver the tape with the adhesive side facing up or down. The tape is passed from the wrap control idler roll 114 over other guide rolls 115 to deliver it to the point desired. It is preferred to have an additional drive roll 116 located in the path of the tape travel to aid in supplying it positively to the tape storage unit 71 with a minimum of tension. This roll also has the function to pull the tape off the peeler roll. The peeler roll 113 is driven from motor 117 which contacts a driving drum 118 affixed to one end of the peeler roll 113. The additional drive roll 116 can be driven from the first drive roll 113. It is preferred for the second drive roll to be driven at a slightly faster speed than the first drive roll to aid in the removal of the tape from the peeler roll. With such an arrangement the belt type drive allows slippage to avoid exerting too much tension on the tape.

The wrap control idler roll 114 is mounted on a movable bearing to allow it to be swung from one side of the drive roll to the other depending on whether the tape is to be delivered with the sticky side up or down. This can be conveniently accomplished by use of a concentric plate 120 attached to a lever arm 121 and which pivots about the shaft of the drive roll. The wrap control idler roll 114 is moved through an arc by moving the lever arm 121. In this manner the amount of wrap of the tape about the peeler roll can also be controlled. In order to assure smooth movement of the wrap control idler roll a travel arm 122 is provided on a concentric plate affixed to the end of the roll opposite the lever arm 121. The tape dispenser is capable of delivering to the storage device a tape six inches wide under substantially no tension.

The peeler roll 113 preferably has flat rings 123 about its periphery at spaced intervals to minimize the contact of the tape with the roll to prevent undue sticking. It is essential, however, for the roll to have sufficient contact area to pull the tape off of its supply roll. The guide members which contact the adhesive side of the tape in one embodiment are made up of a series of spaced circular discs 124 mounted on a common shaft. Such construction minimizes contact with the adhesive on the tape and therefore prevents drag and undue tension on the tape. Alternately, the guide rolls can be a roll having a series of spaced grooves 125 about its periphery.

The tape storage device 71, 71' actuates the tape dispenser through a control switch 140 which turns the tape dispenser drive motor on and off. The switch 140 is actuated to turn the drive motor on when tension is placed on the tape as it leaves the dispenser. This tension pulls guide roll 141 forward which causes assembly 142 to move forward thereby actuating switch 140 to start the drive motor. When the storage device is full, the tension on the tape is released and the assembly 142 moves backward thereby turning the motor off. The assembly 142 is held in the off position by slight pressure of a spring 143 which pulls on pivot arm 144 connected to a horizontal bracket which supports the movable guide roll 141.

Figure 19:
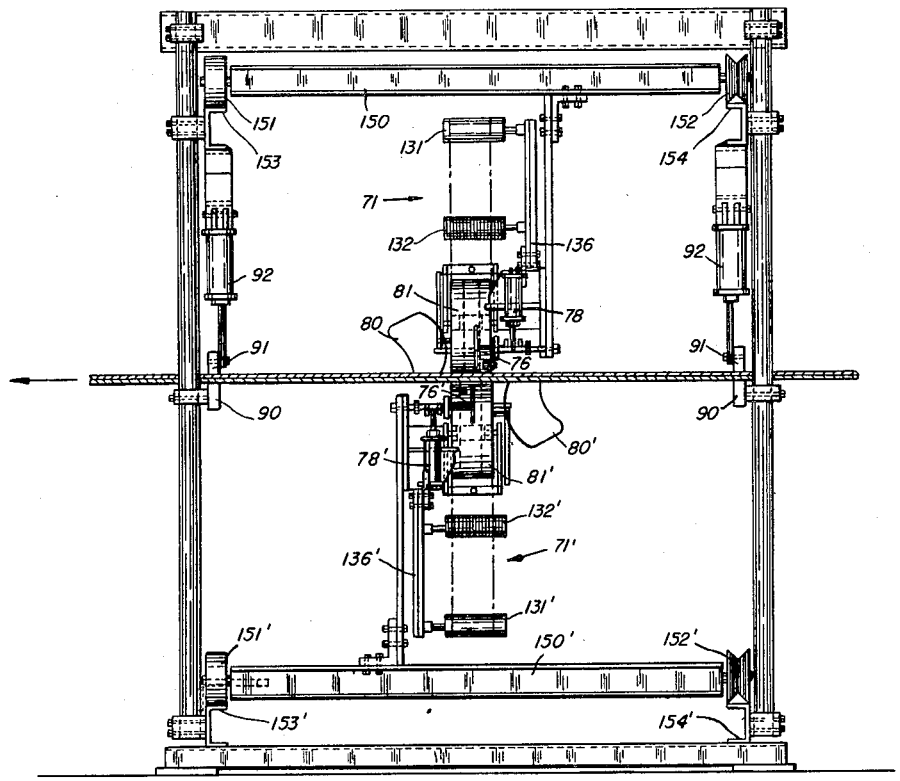
FIG. 19 is a front elevational view of the web splicer and tape dispenser showing the frames, tracks and carriage and their associated mechanisms.
Figure 20:
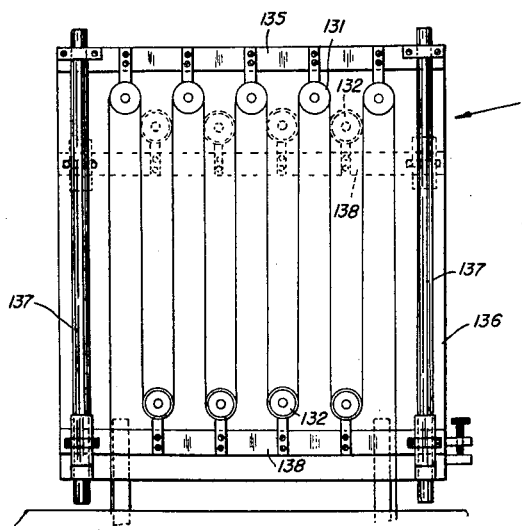
FIG. 20 is a side elevational view of the tape festoon assembly showing the location of the floating rolls before and after each splicing operation.

The tape is delivered to the storage device, generally indicated at 71, 71' as illustrated in FIGS. 19 and 20 which is of sufficient capacity to hold the desired length of tape required for a single splice. When making a twelve foot splice therefore, the storage device would hold a tape over twelve feet long. The tape storing device comprises two sets of parallel rolls 131, 132 about which the tape can form a sinuous path. The two sets of rolls move toward each other as the tape is pulled from the storage device. Each roll in the set is mounted on a shaft secured to its frame 135, 138. The frame of the bottom set of rolls 132 rides freely on vertical rods 137 so that as the tape is dispensed, the set of rolls 132 are pulled upward until the storage device is empty as indicated by the rolls in dotted lines in FIG. 20. An adjusting screw 139 can be provided as indicated in FIG. 21 for regulating the amount of tape which can be held by the storage device. The adjusting screw 139 is so located as to limit the downward movement of the lower set 132 of rolls. The capacity of the storage device would be reduced an amount equal to $d2r$ wherein $d$ is the distance the adjusting screw moves and $r$ is the number of rolls in the set.

The web splicing apparatus is mounted on a frame 150 which extends across the width of the web and is allowed to transverse the web by means of wheels 151, 152 located on each end of the frame which run on tracks 153, 154 across the web. The apparatus is driven across the web by a motor M through drive chains 157 which exert a force on one set of wheels 152.

As mentioned hereinabove, identical units are mounted above and below the web in such a fashion that they cooperate together to splice the webs together. The upper apparatus comprises a tape applying wheel 81 which is pivotally connected to the frame and which is also connected to a hydraulic cylinder 96, which when suitable pressure is applied to the cylinder will cause the tape applying wheel to move downwardly and press against the surface of the web. The tape applying wheel 81' on the lower apparatus is in a fixed position. Suitable adjusting screw and connecting links 146 are provided in place of the hydraulic cylinder on the upper apparatus. The lower tape applying wheel 81' is fixed in a position whereby it forces the abutting webs upward thereby creating a gap between the webs which will remain after the tape is applied. The tape applying wheels 81, 81' are not driven but rely on their pressure against the web and the movement of the carriage to turn them and apply the tape.

Located between the cutters and the tape applying wheel so that they transverse the web prior to the tape applying wheel are the plows 80, 81' which remove the scrap ends of the webs. The plows have leading edges which extend in front of the cutters so that they will be in place between the web before the cutters go into operation. The operator before making the splice pushes the apparatus slightly forward to place the leading edges of the plows between the webs.

Figures 28, 29:
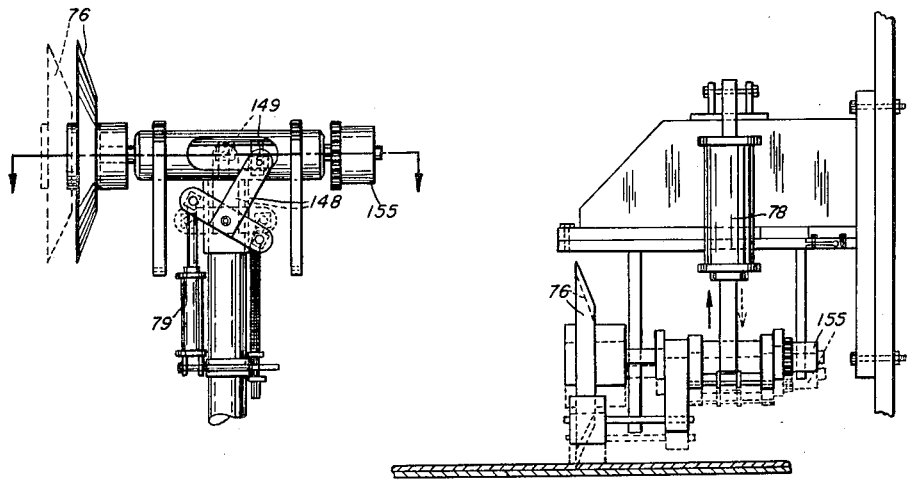
FIG. 28 is an enlarged front elevational view of a fragmentary portion of one of the slitter assemblies showing the mechanism used to engage the slitter in the vertical position.
FIG. 29 is an enlarged bottom view of a fragmentary portion of one of the slitter assemblies showing the mechanism used to engage the slitter in the horizontal position.
Figure 30:
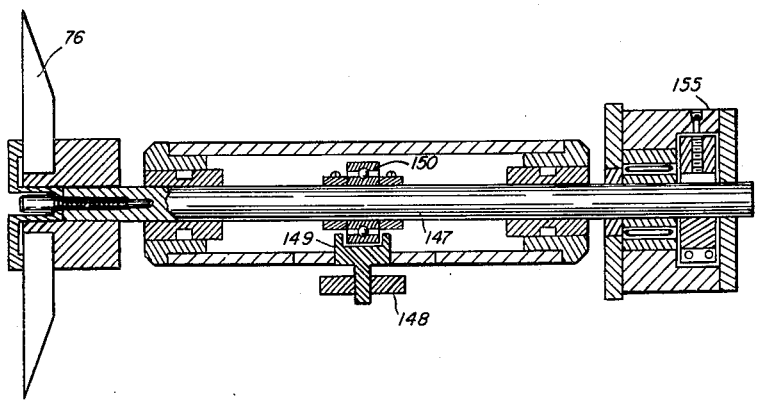
FIG. 30 is an enlarged sectional view on the line 30—30 of FIG. 29.
Figure 31:
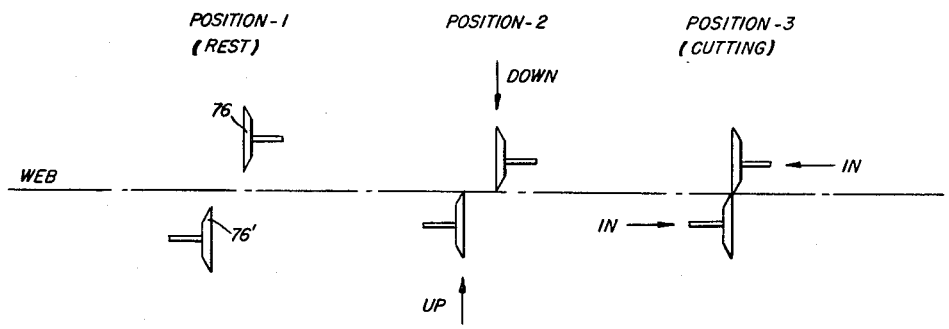
FIG. 31 shows schematically the sequence of the slitter motion.
Figure 32:
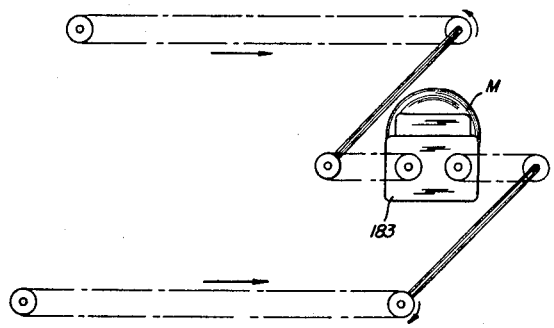
FIG. 32 is a diagrammatic view of the carriage drive.

The cutter is a circular rotary cutter which meshes with a similar cutter located on the under side of the web. The cutters come into contact with the web by two motions which enable the webs to be sheared. The movement of the cutters is illustrated in FIGS. 29 to 31. The cutters first move downward to overlap each other slightly and then move horizontally to come into shearing engagement. The cutters should contact at a slight angle of about 2° to each other to make them self-sharpening. The cutters can be adjusted to a suitable angle by adjustment screws 129 and 130. The downward movement is controlled by a hydraulic cylinder 78 which is affixed to the frame and the horizontal movement is controlled by a hydraulic cylinder 79 which is joined to the shaft 147 of the rotary cutter by a lever arm 148. The horizontal movement is obtained by moving the whole shaft 147 through a slide fixture 149 which exerts force on a bearing 150 about the shaft. The slide fixture is moved by the lever arm 148. The rotary cutters are driven by means of motors 77, 77' connected to a sprocket 155 secured on the end of the slitter shaft 147 through a chain 158. The cutters have a free wheeling clutch so that they can be rotated faster than driven. Depth control rolls 128, 128' are located in front of the cutters to hold the webs together as they are cut.

The apparatus is readied for operation by an operator who takes the end of the tape from a tape holding apparatus while at the same time setting the tape cutting mechanism and then secures it to a clamp located on the tape applicator wheel. The tape applicator wheels are weighted so that they return to the same position when allowed to rotate freely. This is done on both the top and underside of the web. The clamp comprises a pivot arm 158, pivoting on a pin 159 located at one end. The pivot arm has a rod 160 which extends at a right angle from each side of a pivoting member. The face of the tape applicator wheel is provided with a groove 161 which allows the rod and pivoting member to set flush into the surface of the tape applying roll. The clamp is released so that a new end of the tape can be secured by the operator pushing on lever 162 which is secured to the pivot arm 158 at pivoting pin 159 and which makes it pivot away from the tape applying roll. A spring 163 is provided which presses against the lever arm 154 to force it back into a closed position. The tape is passed along the surface of the tape applying wheel and over the groove 161. The lever 162 is then released to allow pivot arm 158 and its associated rod 160 to return to its flush position with the roll thereby forcing the end of the tape into the groove 161. This arrangement resists the release of the tape when the pull is at a right angle to the tape applying wheel but allows the tape to slip out when the tape applying wheel presses the tape against the web.

After the splicing apparatus has passed over the web and completed the splicing, one of the wheels on which the carriage is supported contacts an electrical switch 169 which has the dual function of causing the end of the tape to be cut through solenoid 170 and also release the solenoids in the hydraulic system causing all of the spring return hydraulic cylinders to return to starting position. The solenoid 170 through suitable connecting linkage 171 is connected to an arm 172 pivoted on its opposite end which is caused to move forward by the solenoid thereby pushing the center point of toggle tensioning mechanism 173 releasing it which by the action of a spring 174 forces a second pivot arm 175 downward. The second pivot arm 175 is secured at its pivoting point to an arm 176 which carries a tape holder 177 with a tape cutter 178 affixed. The tape holder presses the tape against a stop 179 which has a groove 180 for accommodating the cutter 178. The cutter passes through the tape into groove 180 thereby severing the tape as the tape holder presses the tape against stop 179. The mechanism is reset by the operator by pulling back on the tape holder which causes the toggle tensioning mechanism 173 to be extended to a lock position.

The splicing apparatus is started in operation by pushing start switch 181 shown in FIG. 33 which causes relay 180 to close thereby closing the circuit. The relay also actuates solenoid valve 93 which puts the hydraulic electrical system in operation. The circuit is opened by the carriage which contacts switch 164 which is normally closed. The splicing apparatus is brought back to start position by a switch (not shown) which reverses the carriage motor.

Various other modifications of the invention as disclosed above and illustrated in the drawings which are within the sprit and scope of the invention will occur to persons skilled in the art.

What is claimed is:

1. A web splicing device for splicing two webs together by overlapping the leading end of a new web on the terminal end of an exhausted web, shearing the overlapped webs transversely, removing the scrap ends and applying pressure sensitive tape over both sides of abutting edges of said webs which comprises two clamps for holding the webs in aligned and overlapping relationship, means for vertically reciprocating said clamps in and out of engagement with said webs, a carriage capable of moving transversely across the webs on both sides thereof between said clamps, means for reciprocating the carriage across the webs, a cooperative pair of rotary cutters secured to the carriage on opposite sides of the overlapping webs, means for rotating said cutters, means for vertically moving said rotary cutters into vertical alignment, means for horizontally moving said rotary cutters together in shearing relation, plow means secured to said carriage and positioned to remove the end portions of the webs severed by the cutters, a cooperative pair of freely revolvable tape applicator wheels secured to the carriage and one on each side of the webs, said applicator wheels being adapted to roll longitudinally over the sheared edges of said webs following the shearing of said webs by said cutter to bring said edges in abutting relation and to secure pressure sensitive tape over said abutting edges, means for vertically reciprocating one of said applicator wheels into splicing position, a collapsible tape storage device associated with each of said tape applicator wheels for holding sufficient tape to complete said splice, means for securing the leading end of said tape in storage to said tape applicator wheels, an automatic pressure sensitive tape dispensing device associated with each of said tape storage devices for filling said storage device with sufficient tape to complete one splice.

2. The web splicing device as defined in claim 1 wherein one of said tape applicator wheels is located in a fixed position which causes said abutting webs to be moved slightly from the horizontal as the webs are spliced together thereby creating a gap between said abutting webs prior to applying said pressure sensitive tape.

3. The web splicing device as defined in claim 1 wherein the horizontal plane of said cooperative pair of rotary cutters are at a small angle to each other when in shearing relationship.

4. The web splicing device as defined in claim 1 wherein said rotary cutters are rotated at a tangential rate of speed less than the rate of speed that said cutters travel across said webs.

5. The web splicing device as defined in claim 1 wherein said free, revolvable tape applicator wheels are each weighted at one end so as to return to the same position each time the wheels are out of contact with said webs.

6. The web splicing device as defined in claim 1 wherein said tape storage device comprises two sets of rolls capable of reciprocating apart, said rolls being adapted to receive said pressure sensitive tape in a sinuous path going from a roll on one of said sets to a roll on the other set whereby the capacity of said device for storing tape increases as the distance between said sets increases.

7. The web splicing device as defined in claim 1 wherein said automatic pressure sensitive tape dispensing device comprises a cradle for holding a roll of pressure sensitive tape, a peeler roll located adjacent to said roll of tape and adapted to peel said tape from said roll at a substantially tangential angle to said tape roll, a wrap control idler roll for guiding the adhesive side of the tape in contact with said peeler roll, the frictional contact of said adhesive side of the tape with said peeler roll being sufficient to allow peeling of the tape from the roll by rotating said peeler roll and means for rotating said peeler roll about its axis to peel off said tape.

8. The web splicing device as defined in claim 1 wherein said automatic pressure sensitive tape dispensing device is actuated to supply tape to said tape storage device by the absence of tension on the tape between said tape dispensing device and said tape storage device.

9. The web splicing device as defined in claim 1 which includes a tape holding and cutting mechanism for severing said tape and holding the succeeding end of said tape after said severence when said webs have been spliced together.

10. The web splicing device as defined in claim 1 wherein said means for securing the leading edge of said pressure sensitive tape to said tape applicator rolls comprises a T-shaped pivoting member pivoted at its base and recessed in the surface of said tape applicator roll to provide a smooth, uninterrupted surface on said tape applicator roll, the top of said T-shaped member extending transversely across the surface of said tape applicator wheel and being adapted to hold the pressure sensitive tape in said recess, said T-shaped member being capable of releasing said tape when said tape is pulled in a direction tangent to the surface of said tape applicator wheels and to hold said tape when force is exerted on said tape at a right angle to the surface of said tape applicator wheels.

11. The web splicing device as defined in claim 1 wherein said automatic tape dispenser comprises a cradle for holding a roll of pressure sensitive tape, a peeler roll located adjacent to the tape roll for peeling the tape from said tape roll, a wrap control idler roll for guiding the adhesive side of the tape in contact with said peeler roll, the contact of the tape with said peeler roll being sufficient to allow peeling of the tape from the roll, a drive roll over which said tape will pass to operate in conjunction with said peeler roll thereby preventing said tape from remaining on said peeler roll, means for driving said peeler roll and said drive roll, a horizontally reciprocating guide member for guiding the tape, said guide member reciprocating in one direction when tension is placed on the tape leaving said guide member thereby starting the operation of said means for driving said peeler roll and drive roll.

References Cited in the file of this patent
UNITED STATES PATENTS

| | | |
|---|---|---|
| 2,012,014 | McCarthy | Aug. 20, 1935 |
| 2,606,136 | Garrett et al. | Aug. 5, 1952 |